(12) United States Patent
Ohnishi (10) Patent No.: US 8,368,800 B2
(45) Date of Patent: Feb. 5, 2013

(54) IMAGE RECOGNITION DEVICE, FOCUS ADJUSTMENT DEVICE AND IMAGING DEVICE

(75) Inventor: Naoyuki Ohnishi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 975 days.

(21) Appl. No.: 12/289,449

(22) Filed: Oct. 28, 2008

(65) Prior Publication Data

US 2009/0109322 A1 Apr. 30, 2009

Related U.S. Application Data (60) Provisional application No. 61/000,892, filed on Oct. 30, 2007.

(30) Foreign Application Priority Data

Oct. 30, 2007 (JP) .................................. 2007-282147

(51) Int. Cl.
G03B 13/36 (2006.01)

(52) U.S. Cl. ........................... 348/349; 396/95; 396/123

(58) Field of Classification Search .................. 348/345, 348/352; 396/95, 121, 123
See application file for complete search history.

(56) References Cited

U.S. PATENT DOCUMENTS

| 5,995,767 | A | * | 11/1999 | Lee et al. | 396/123 |
| 6,067,114 | A | * | 5/2000 | Omata et al. | 348/345 |
| 7,826,735 | B2 | * | 11/2010 | Yamaguchi | 396/95 |
| 7,869,704 | B2 | * | 1/2011 | Uenishi | 396/95 |
| 8,106,965 | B2 | * | 1/2012 | Shimizu | 348/234 |
| 2004/0202461 | A1 | * | 10/2004 | Nakahara | 396/104 |
| 2005/0007486 | A1 | * | 1/2005 | Fujii et al. | 348/345 |
| 2005/0264679 | A1 | * | 12/2005 | Sasaki et al. | 348/345 |

FOREIGN PATENT DOCUMENTS

| JP | 08062484 A | * | 3/1996 |
| JP | 2005031200 A | * | 2/2005 |
| JP | 2006058431 A | * | 3/2006 |
| JP | 2007127938 A | * | 5/2007 |

OTHER PUBLICATIONS

Translation of Notification of Reasons for Refusal dated Dec. 13, 2011, Japanese application 2007-282147.*

* cited by examiner

Primary Examiner — Clayton E Laballe
Assistant Examiner — Leon W Rhodes, Jr.
(74) Attorney, Agent, or Firm — Oliff & Berridge, PLC

(57) ABSTRACT

There are provided a focus detector detecting a focusing state of an optical system with respect to a plurality of focus detection positions that are set in an imagefield of the optical system; a recognizer setting a reference image with respect to an image to be a reference, and recognizing a position corresponding to the reference image of an image in the optical system; a selector selecting the focus detection position to be a target of focus adjustment of the optical system based on one of the focusing state and a position corresponding to the reference image recognized by the recognizer; and a controller executing at least one of resetting of the reference image and a retrying recognition of the position corresponding to the reference image when the focus detection position is selected based on the focusing state.

18 Claims, 6 Drawing Sheets

IMAGE RECOGNITION DEVICE, FOCUS ADJUSTMENT DEVICE AND IMAGING DEVICE

BACKGROUND OF THE INVENTION

1. Field of the Invention

The present invention relates to an image recognition device, a focus adjustment device and an imaging device.

2. Related Background of the Invention

Known is an autofocus system in which an image of an object to be focused is stored as a reference pattern, an image that matches with this reference pattern is detected by a pattern matching processing from among photographed images, and while updating the reference pattern every time an image of the object is detected, an AF area is moved to this detection position to track the object (Japanese Patent Laid-Open No. 2006-58431).

However, a problem exists in that when the target object is misrecognized in tracking operation, the reference pattern is not suitably updated, and the object cannot be recognized with accuracy.

SUMMARY OF THE INVENTION

An object of the present invention is to solve such problems and to provide an image recognition device, a focus adjustment device and an imaging device that can recognize an object with high accuracy.

To achieve the above-mentioned object, the present invention is an image recognition device comprising:

a focus detector that detects a focusing state of an optical system with respect to a plurality of focus detection positions that are set in an imagefield of the optical system;

a recognizer that sets a reference image regarding an image to be a reference, and recognizes a position corresponding to the reference image belong to an image by the optical system;

a selector that selects the focus detection position to be a target of focus adjustment of the optical system based on one of the focusing state and a position corresponding to the reference image recognized by the recognizer; and a controller that executes at least one of resetting of the reference image and a retrying recognition of the position corresponding to the reference image when the focus detection position is selected based on the focusing state.

Furthermore, it is preferable that the selector selects the focus detection position based on the focusing state or the position corresponding to the reference image satisfying a predetermined condition.

It is preferable that the controller executes at least one of resetting of the reference image and a retrying recognition of the position corresponding to the reference image when the focus detection position is selected continuously not less than a predetermined number of times based on the focusing state.

It is preferable that the selector selects the focus detection position based on whether the focus detection position is present or not in the position corresponding to the reference image.

In this case, it is preferable that the controller does not execute at least one of resetting of the reference image and a retrying recognition of the position corresponding to the reference image when although the focus detection position is absent in the position corresponding to the reference image, the position corresponding to the reference image is reliable.

Furthermore, it is preferable that the controller executes at least one of resetting of the reference image and a retrying recognition of the position corresponding to the reference image when the focus detection position that is present outside the position corresponding to the reference image is selected by the selector.

It is preferable that the controller executes at least one of resetting of the reference image and a retrying recognition of the position corresponding to the reference image when a difference between a time of setting the reference image and a time of detecting the focusing state is not less than a predetermined time period.

It is preferable that the controller executes at least one of resetting of the reference image and a retrying recognition of the position corresponding to the reference image when although the difference between the time of setting the reference image and the time of detecting the focusing state is within a predetermined time period, the focus detection position is absent in the position corresponding to the reference image.

A focus adjustment device according to the present invention comprises any of the above-mentioned image recognition devices. In addition an imaging device according to the present inventions comprises any of the above-mentioned image recognition devices.

It is preferable that an imaging device according to the present invention comprises an observing optical system that can observe an image in the optical system; and that the recognizer is disposed in the observing optical system, and includes an image pickup device that picks up an image in the optical system, and recognizes the position corresponding to the reference image based on image data picked up by the image pickup device.

It is preferable that an image recognition device according to the present invention comprises a focus detector that detects a focusing state of an optical system with respect to a plurality of focus detection positions that are set in an imagefield of the optical system; a recognizer that sets a reference image regarding an image to be a reference, and recognizes a position corresponding to the reference image belong to an image by the optical system; and a controller that executes at least one of resetting of the reference image and a retrying recognition of the position corresponding to the reference image when a difference between a time of setting the reference image regarding an image to be a reference and a time of detecting the focusing state of the optical system is not less than a predetermined time period.

The present invention is an image recognition method comprising the steps of:

detecting a focusing state of the optical system with respect to a plurality of focus detection positions that are set in an imagefield of the optical system;

setting a reference image regarding an image to be a reference;

recognizing a position corresponding to the reference image belong to an image by the optical system;

selecting the focus detection position to be a target of focus adjustment of the optical system based on one of the focusing state and a position corresponding to the reference image recognized by the recognizer; and executing at least one of resetting of the reference image and a retrying recognition of the position corresponding to the reference image when the focus detection position is selected based on the focusing state.

Furthermore, it is preferable that the focus detection position is selected based on the focusing state or the position corresponding to the reference image satisfying a predetermined condition.

It is preferable that at least one of resetting of the reference image and a retrying recognition of the position corresponding to the reference image is executed when the focus detection position is selected continuously not less than a predetermined number of times based on the focusing state.

It is preferable that the focus detection position is selected based on whether the focus detection position is present or not in the position corresponding to the reference image.

It is preferable that when although the focus detection position is absent in the position corresponding to the reference image, a reliability of the position corresponding to the reference image is high, at least one of resetting of the reference image and a retrying recognition of the position corresponding to the reference image is not executed.

It is preferable that at least one of resetting of the reference image and a retrying recognition of the position corresponding to the reference image is executed when the focus detection position that is present outside the position corresponding to the reference image is selected.

It is preferable that at least one of resetting of the reference image and a retrying recognition of the position corresponding to the reference image is executed when a difference between a time of setting the reference image and a time of detecting the focusing state is not less than a predetermined time period.

It is preferable that at least one of resetting of the reference image and a retrying recognition of the position corresponding to the reference image is executed when although the difference between the time of setting the reference image and the time of detecting the focusing state is within a predetermined time period, the focus detection position is absent in the position corresponding to the reference image.

In addition, the present invention is an image recognition method detecting a focusing state of an optical system with respect to a plurality of focus detection positions that are set in an imagefield of the optical system; setting a reference image regarding an image to be a reference; recognizing a position corresponding to the reference image belong to an image by the optical system; and executing at least one of resetting of the reference image and a retrying recognition of the position corresponding to the reference image when a difference between a time of setting the reference image regarding an image to be a reference and a time of detecting the focusing state of the optical system is not less than a predetermined time period.

DESCRIPTION OF THE PREFERRED EMBODIMENTS

Figure 1:
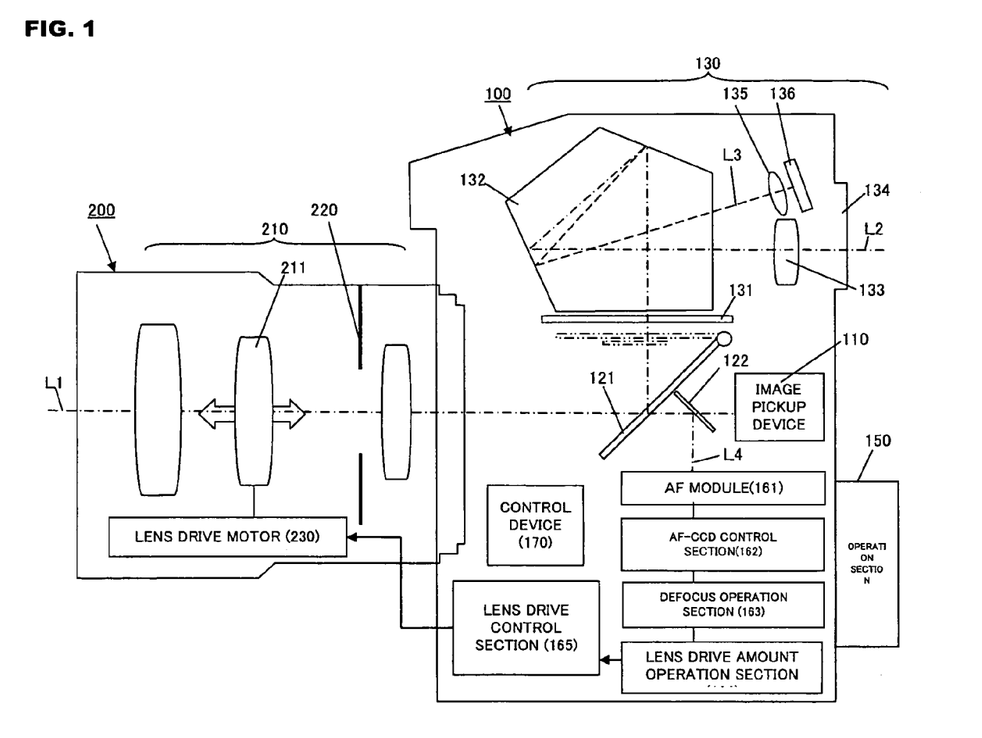
FIG. 1 is a block diagram illustrating a camera according to an exemplary embodiment of the present invention.

Hereinafter, an exemplary embodiment according to the present invention will be described referring to the drawings. FIG. 1 is a block diagram illustrating a camera according to the embodiment of the present invention. A camera 1 according to this embodiment includes a camera body 100 and a lens barrel 200 that is detachably mounted onto this camera body 100.

There are provided in the lens barrel 200 a lens group 210 including a focus lens 211 that can move along an optical axis L1, a diaphragm mechanism 220 restricting a luminous flux and a lens drive motor 230 causing the focus lens 211 to move along the optical axis L1.

The specific construction of a movement mechanism along the optical axis L1 of the focus lens 211 is not particularly limited. As one example, an rotating barrel is rotatably inserted into a fixed barrel that is fixed to the lens barrel 200, helicoid grooves (helical grooves) are formed on an inner circumferential surface of this rotating barrel, as well as an end portion of a lens frame that fixes the focus lens 211 is made to fit to the helicoid grooves. Furthermore, the rotating barrel is brought in rotation by the lens drive motor 230, whereby the focus lens that is fixed to the lens frame is to move in a straight line along the optical axis L1.

By rotation of the rotating barrel with respect to the lens barrel 200 in such a way, the focus lens 211 that is fixed to the lens frame moves in a straight line in the direction of the optical axis L1. The lens drive motor (actuator) 230 acting as a drive source thereof is provided at the lens barrel 200. The lens drive motor 230 and the rotating barrel are connected through a transmission that is formed of, for example, a plurality of gears. When a drive shaft of the lens drive motor 230 is driven to rotate in any one direction, this rotation is transmitted to the rotating barrel at a predetermined gear ratio, and by rotation in any one direction of the rotating barrel, the focus lens 211 that is fixed to the lens frame is to move in a straight line in any direction of the optical axis L1. Incidentally, when the drive shaft of the lens drive motor 230 is driven to rotate in an opposite direction, a plurality of gears that form the transmission is brought in rotation in the opposite direction as well, and the focus lens 211 is to move in a straight line in the opposite direction of the optical axis L1.

The focus lens 211, by the above-described rotation of the rotating barrel, can move in the optical axis L1 direction between an end on the camera body 100 side (referred to as the nearest end) to an end on the object side (referred to as the infinite end). This movement is controlled by a command from a lens drive controller of the camera body 100.

There is provided at the camera body 100 an image pickup device 110 that is formed of a two-dimensional CCD image sensor, an MOS sensor, a CID or the like, and electric image signals having been subjected to photoelectric conversion at this image pickup device 110 are stored in a memory not illustrated.

There is provided on the front of the image pickup device 110 a half mirror 121 that can turn a predetermined angle and a total reflection mirror 122 that rotates along with this half mirror 121. These half mirror 121 and total reflection mirror 122 are positioned indicated by solid lines in an autofocus mode of an automatic focusing operation. When a shutter is pressed (released) in this state, they are turned in the position indicated by two-dot chain lines, and an object image is formed at the imaging device 110 to be exposed.

Furthermore, there is provided at the camera body 100 an auto-focus module 161 (hereinafter, it is referred to as an AF module as well) for making an automatic focusing control. Further, in the autofocus mode, the half mirror 121 and the total reflection mirror 122 are in the positions indicated by solid lines in the same drawing, so that a luminous flux from the object is introduced to the half mirror 121 through the focus lens 211, and a part thereof transmits through this half mirror 121 and enters into the AF module 161 along an optical axis L4 via the total reflection mirror 122. With the use of this AF module 161, an automatic focusing control by phase difference detection method using an object light is made.

Whereas, a part of the object light having been reflected at the half mirror 121 passes through a finder screen 131 that is disposed on the surface optically equivalent to the image pickup device 110 to be introduced to a penta-prism 132, bent at the penta-prism 132, and thereafter passes through an eyepiece lens 133 along an optical axis L2 to be introduced to an eyeball of a photographer. Whereby, in the state of not being released, and an object and a background thereof can be observed through the finder 134.

In addition, there are provided in the vicinity of the eyepiece lens 133 a photometric lens 135 and a photometric sensor 136. A part of the object light having been reflected at the half mirror 121 is image-formed at the finder screen 131 and thereafter introduced to the penta-prism 132, bent at the penta-prism 132, and then introduced to the photometric sensor 136 along an optical axis L3.

The photometric sensor 136 is formed of a two-dimensional color CCD image sensor and the like, which detects the brightness of an image for operation of an exposure value on the occasion of photographing, as well as detects an object image on the occasion of an automatic tracking operation according to this embodiment. Image data having been detected by the photometric sensor 136 is output to the below-described control device 170, and used for automatic exposure control and object tracking control.

These finder screen 131, penta-prism 132 and eyepiece lens 133 are also referred to as an observing optical system 130.

Figure 2:
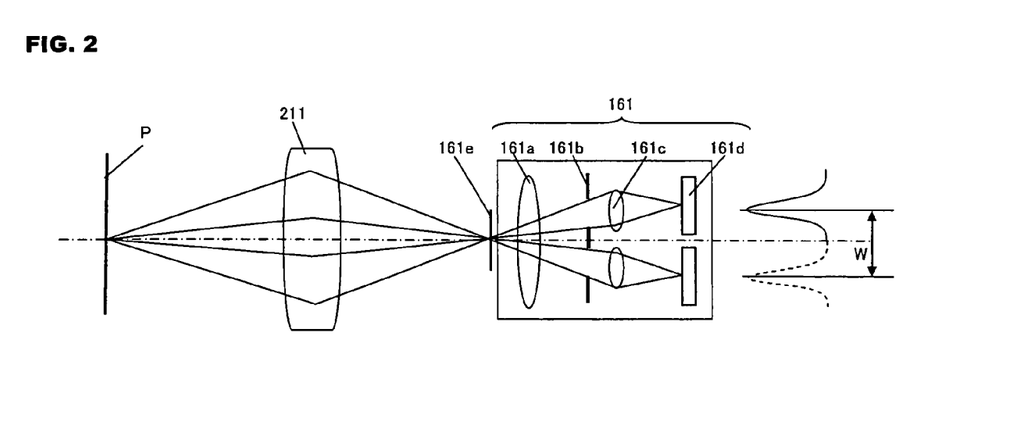
FIG. 2 is a view illustrating an AF module illustrated in FIG. 1.

FIG. 2 is a view illustrating construction of the AF module 161 illustrated in FIG. 1, which is a focus detecting element by the so-called phase difference method. The AF module 161 according to this embodiment includes a converter lens 161a, a diaphragm mask 161b in which a pair of openings are formed, a pair of reimaging lenses 161c and a pair of line sensors 161d. Two partial luminous fluxes are taken out from outgoing beams of the lens barrel 200, and a focus state is detected from the difference in an imaging position of each partial luminous flux.

Further, when as illustrated in the same drawing, an object image P is image-formed on the equivalent surface 161e of the image pickup device 110, it comes to be the focused state. By movement of the imaging lens (focus lens) 211 in the optical axis L1 direction, when the imaging point is shifted to the object side (it is referred to as front focus) or shifted to the camera body 100 side (it is referred to as back focus), it comes to be the state of out of focus.

Incidentally, when an imaging point of the object image P is shifted to the object side away from the equivalent surface 161e, a distance W between a pair of output patterns to be detected by a pair of line sensors 161d comes to be shorter as compared with the distance W in the focused state. Whereas, when the imaging point of the object image P is shifted to the camera body 100 side, the distance W between a pair of output patterns to be detected by a pair of line sensors 161d comes to be longer as compared with the distance W in the focused state.

That is, in the focused state, the output patterns to be detected by a pair of the line sensors 161d are overlapped with respect to the center of the line sensors. Whereas, in the non-focused state, respective output patterns are shifted with respect to the center of the line sensors, that is a phase difference is generated, so that the focus lens 211 is moved such that this phase difference (shift amount) is zero, whereby focusing is done.

Returning to FIG. 1, an AF-CCD controller 162 is the one to control gain or storage time of the line sensors 161e in the autofocus mode. This AF-CCD controller 162 receives from the controller 170 information regarding a focus detection area that is selected as a focus detection position, and reads out a pair of output patterns that are detected by a pair of the line sensors 161e corresponding to this focus detection area, and outputs it to a defocus operation section 162.

The defocus operation section 162, from a pair of the output patterns having been transmitted from the AF-CCD controller 162, operates a shift amount (defocus amount ΔW) of these output patterns, and outputs it to a lens driving amount operation section 164.

The lens driving amount operation section 164, based on the defocus amount ΔW having been transmitted from the defocus operation section 163, operates a lens driving amount Δd for causing this defocus amount ΔW to be zero, and outputs it to a lens drive controller 165.

The lens drive controller 165, while picking up the lens driving amount Δd having been transmitted from the lens driving amount operation section 164, sends a drive command to the lens drive motor 230, and causes the focus lens 211 to move by the lens driving amount Δd.

Incidentally, an operation section 150 is a switch with which a user makes setting of the autofocus mode and other photographing modes, or area selection in each mode. Setting of a target object in the object tracking mode according to this embodiment is also made by operation of this operation section 150.

Figure 3A:
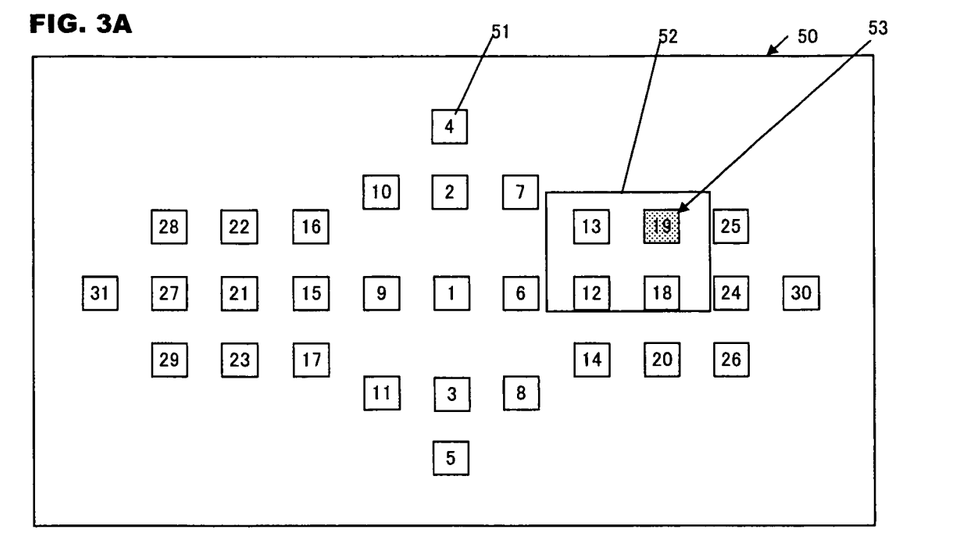
FIG. 3A is a view illustrating a focus detection area, an object area and a focus detection position according to the embodiment of the present invention.
Figure 3B:
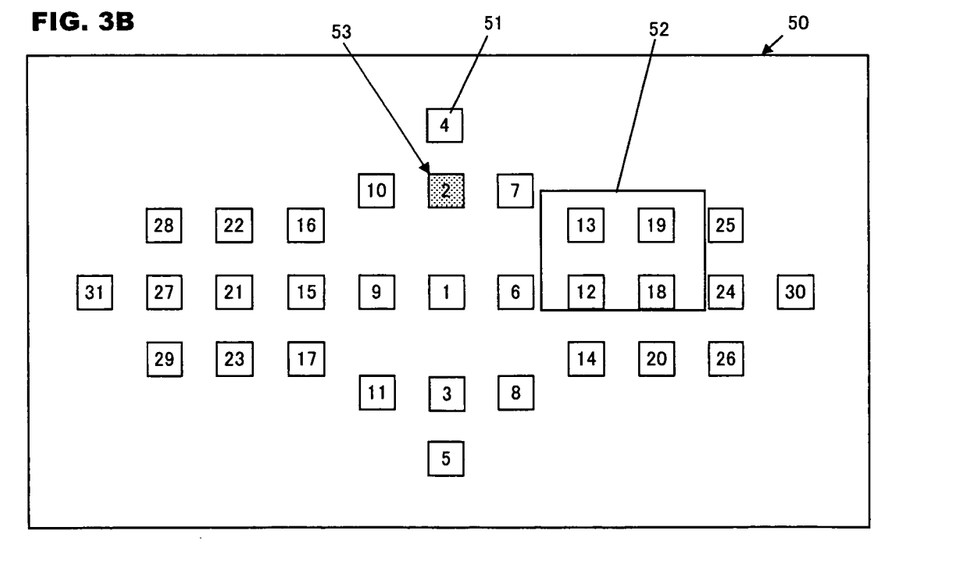
FIG. 3B is a view illustrating a focus detection area, an object area and a focus detection position according to the embodiment of the present invention (when the focus detection position is selected in the object area).
Figure 3C:
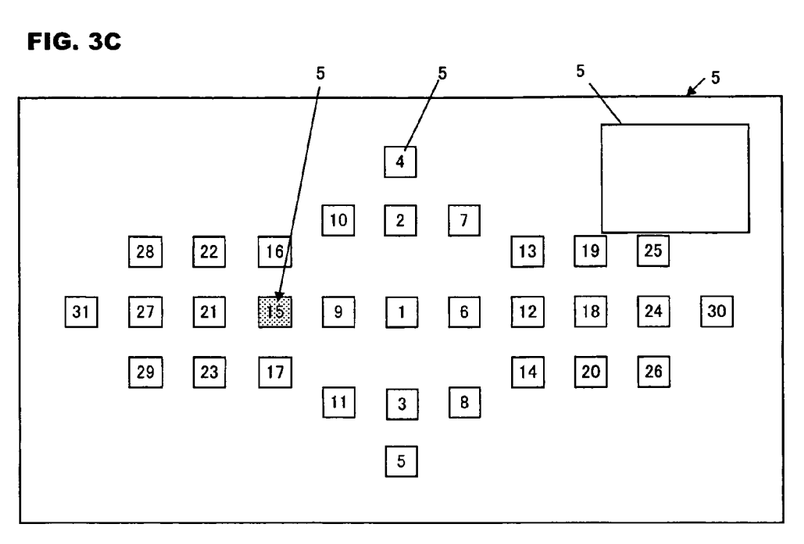
FIG. 3C is a view illustrating a focus detection area, an object area and a focus detection position according to the embodiment of the present invention (when the focus detection position is selected outside the object area).

FIGS. 3A to 3C are drawings illustrating a focus detection area 51, an object area 52 and a selected focus detection position 53 according to this embodiment.

In a predetermined position of an image pickup range of the image pickup device 110, there is provided a plurality of focus detection areas for detecting the focusing state using the lens group 210. Each focus detection area, as illustrated in FIG. 3A, is displayed as the focus detection area 51 on an observation screen 50 to be observed through the finder 134. In this embodiment, as illustrated with numerals of 1 to 31 in the same drawing, there are provided 31 points of focus detection areas 51, and each position corresponds to a predetermined position in the image pickup range of the image pickup device 110.

Further, depending on a predetermined condition as described below, out of these 31 points, one focus detection area 51 to detect the focusing state at this time is selected. This focus detection area is particularly referred to as the focus detection position 53 in order to be discriminated from the other focus detection areas 51 not having been selected. Incidentally, the number of areas or the setting position of these 31 points of focus detection areas 51 can be changed as appropriate.

In addition, on the observation screen 50, the object area 52 when the object tracking mode is set is displayed in a frame shape. This object area 52, on the occasion of starting the object tracking mode, is set in a desired position by operation of the operation section 150 by a user, and is to move by the tracking operation thereafter. This object tracking area 52 also corresponds to a predetermined position of the image pickup range of the image pickup device 110.

The positional relationship between the focus detection area 51, the object area 52 and the focus detection position 53 on the observation screen 50 (it is the same as the image pickup device 110, the finder screen 131 and the equivalent surface 161e of the AF module 161), can be classified into the case in which, as illustrated in FIG. 3A, the focus detection area 51 is present in the object area 52, and the focus detection area 51 present in the object area 52 is selected as the focus detection position 53; the case in which as illustrated in FIG. 3B, although the focus detection area 51 is present in the object area 52, the focus detection area 51 present outside the object area 52 is selected as the focus detection position 53; and the case in which, as illustrated in FIG. 3C, no focus detection area 51 is present in the object area 52 (that is, in this case, the focus detection area 51 present outside the object area 52 is necessarily selected as the focus detection position 53).

Now, the tracking operation of an object according to this embodiment will be described.

Figure 4:
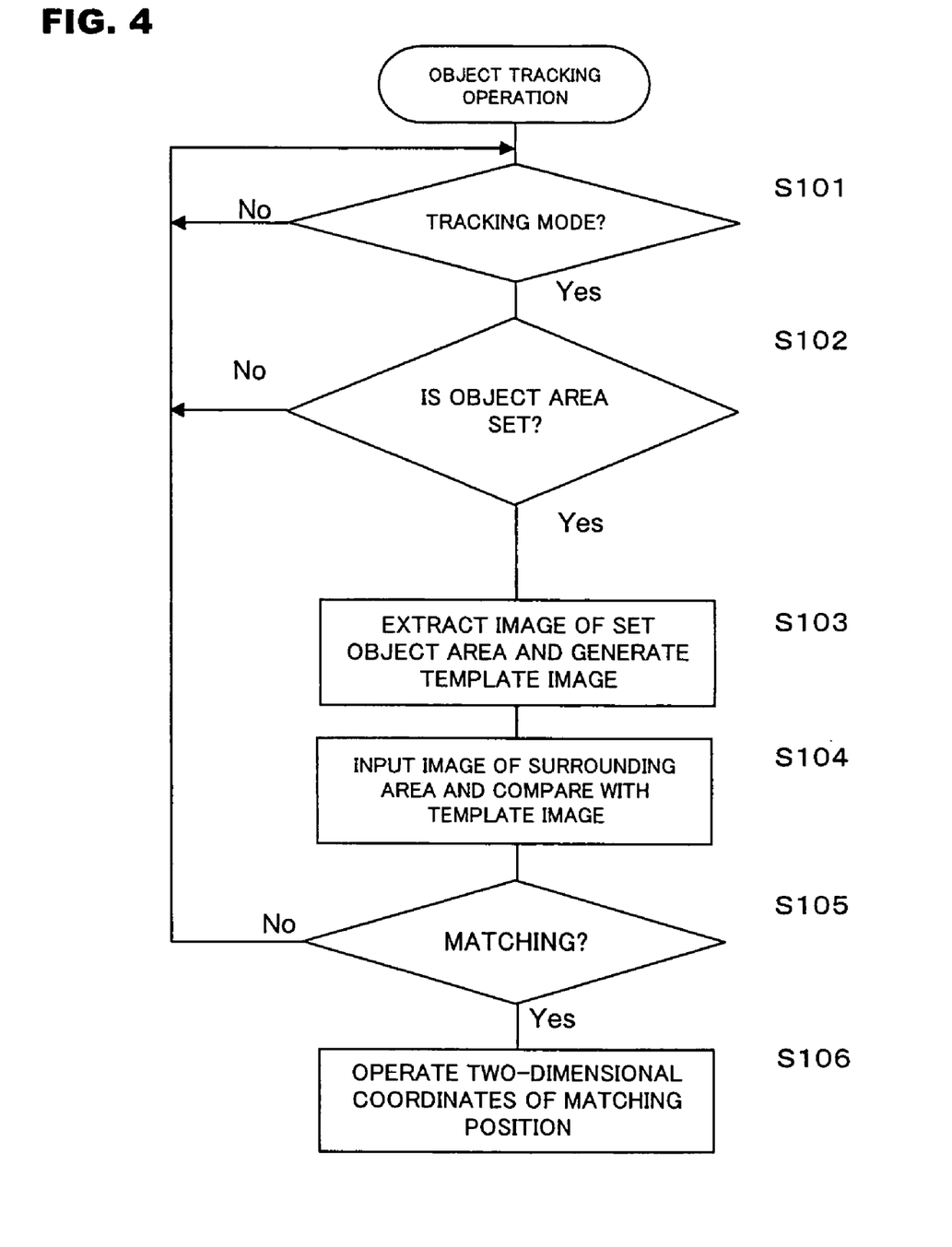
FIG. 4 is a flowchart showing one example of a tracking operation of the object according to the embodiment of the present invention.

FIG. 4 is a flowchart showing an operation example of object tracking. First, in Step S101, it is determined whether or not a user selects a tracking mode (it is referred to as sports mode as well) using the operation section 150 with which a photographing mode is selected. When the tracking mode is selected, operation goes to Step S102; and when it is not selected, this determination is repeated until this tracking mode is selected.

When in Step S101, the tracking mode (sports mode) is selected using the operation section 150, operation goes to Step S102, in which it is determined whether or not the object area 52 is set.

The object area 52 can be set by half press of the release button not illustrated or another provision of an object area setting button. Here, the release button is half pressed in the state in which a movement button, being one of the operation section 150 is operated to its right, left, up or down, and thus the object area is moved to a desired position, whereby a desired region of the observation screen 50 with the use of the finder 134 is set to be the object area 52. That is, a user, while observing through the finder 134, positions the object area 52 over the object intended to be a tracking target and half presses the release button, whereby the object is recognized as a tracking target.

In case where in Step S102, the object area 52 is set, operation goes to Step S103, in which analog output signals of a photoelectric conversion element in the region of the photometric sensor 136 corresponding to the object area 52 having been set is read out, and converted to digital signals. Further, the digital signals of color information are subjected to image processing, thereby generating template image data corresponding to the object area 52. This template image data is a digital image data of the object area 52 illustrated in FIGS. 3A to 3C, and temporarily stored in a memory of the control device 170.

Next, in Step S104, a predetermined surrounding area that includes the object area 52 and is larger than this object area 52, and image data corresponding to the surrounding area after a predetermined time period has elapsed is generated based on output signals from the photometric sensor 136 and compared with the template image data having previously been generated.

Image data for use in this comparison is color information and a luminance value to be detected by the photometric sensor 136. Further, the degree of matching between the template image data and the surrounding image data is estimated as a similarity, as well as the presence or absence of possibility of whether or not another area that matches therewith is in the surrounding area is estimated as a reliability.

Further, in Step S105, a matching processing between the image data in the surrounding area and the template image data is carried out. In the case of matching, operation goes to Step S106, in which two-dimensional coordinates of the area that matches therewith from among image data in the surrounding area is operated and obtained. Incidentally, in the case of not matching, operation returns to Step S101 and the above-described processing will be repeated.

When the image data in the surrounding area matches with the template image data and the two-dimensional coordinates of this area is obtained, the fact of matching and the coordinate information are held at the control device 170. In addition, results of matching processing, that is the similarity and reliability of the template image data and the surrounding image data are held at the control device 170 as well. Incidentally, even when in Step S105, there is no matching, the fact of no matching is held at the control device 170.

Figure 5:
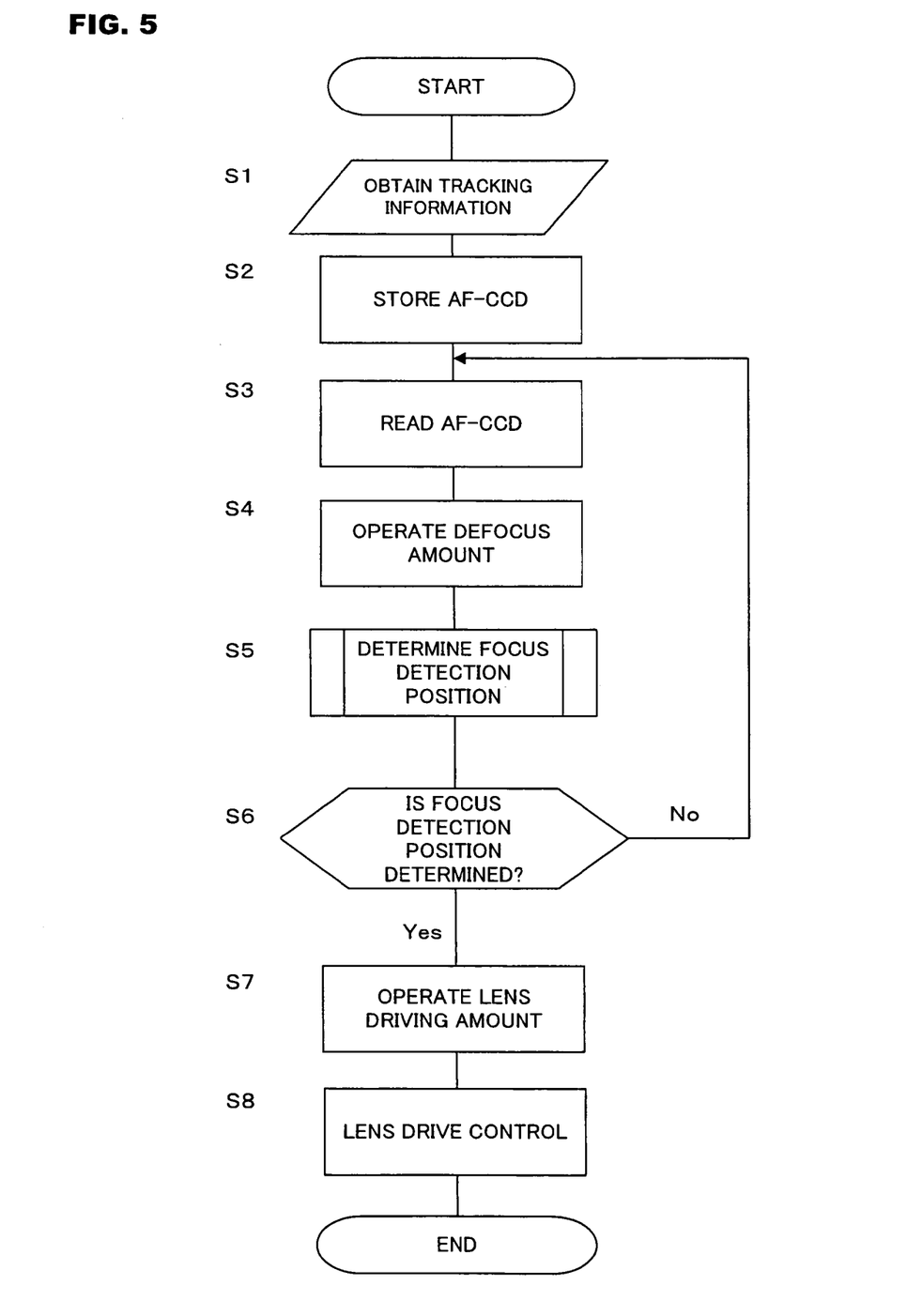
FIG. 5 is a flowchart showing operation of a camera according to the embodiment of the present invention.

Now, operations of a camera according to this embodiment will be described. FIG. 5 is a flowchart showing operations of the camera according to this embodiment.

First, in Step S1, tracking information in the above-described tracking mode of an object is obtained. As this tracking information, in addition to information on whether or not it is matched with the template image data that is held at the control device 170, the similarity and the reliability in the case of matching are also obtained. These tracking information are used in determination processing of the focus detection position in the below-described Step S5.

At the same time, a counter and a flag to be used in a subroutine in the below-described Step S5 are initialized.

In Step S2, after it is confirmed that the autofocus mode is set, the storage of a luminous flux is done using the line sensors 161e of the AF module 161. In the next Step S3, signal information having been stored in the line sensors 161e is read out.

The line sensors 161e from which signal information is read out at this time are the line sensors 161e corresponding to the focus detection area set using the operation section 150 by a user. The user, by operation of the operation section 150, can select a desired focus detection area 51 out of 31 points of the focus detection areas 51 illustrated in FIG. 3A. Hereinafter, descriptions will be made on the assumption that all the focus detection areas 51 are selected for reasons of convenience.

In Step S4, the defocus amount at each of the line sensors 161e from which information signal has been read out, i.e., in each focus detection area 51 is operated and obtained.

In Step S5, based on each defocus amount having been obtained, the optimum focus detection area for focusing that is the focus detection position 53 is determined from among the focus detection areas 51.

Figure 6:
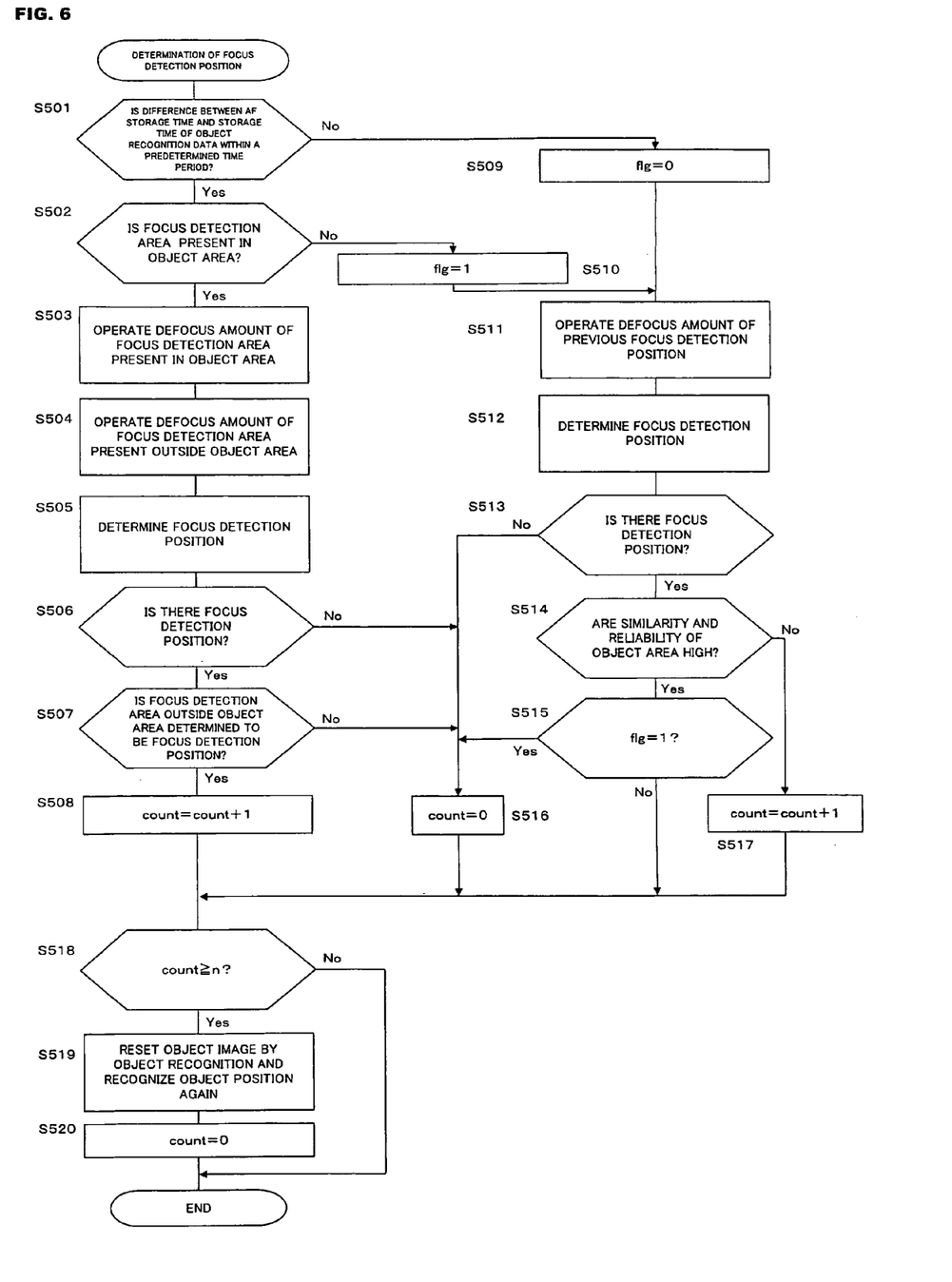
FIG. 6 is a flowchart showing a subroutine of Step S5 of FIG. 5.

FIG. 6 is a flowchart showing a subroutine of Step S5 of FIG. 5.

First, in Step S501, the difference between an AF storage time and a storage time of object recognition information is operated, and it is determined whether or not this is within a predetermined time period. The AF storage time is the storage time into the line sensors 161e of the AF module 161 in Step S2 of FIG. 5, and the object information storage time is a generation time of the template image data in Step S103 of FIG. 4. To track an object, the template image data is generated, and the object is recognized. When, however, it is a predetermined time period ago that recognition of this object is made, since recognition information of this object is old, and it is not appropriate to use it, selection is made in this Step S501.

When in Step S501, the difference between the AF storage time and the storage time of object recognition information is within a predetermined time period, operation goes to Step S502, in which it is determined whether or not the focus detection area 51 is present in the object area 52 being currently set. In the examples illustrated in FIGS. 3A to 3C, in the case of a positional relationship as are FIGS. 3A and 3B, the focus detection area 51 is present in the object area 52; and in the case of a positional relationship as is FIG. 3C, the focus detection area 51 is absent in the object area 52.

When in Step S502, it is determined that the focus detection area 51 is present in the object area 52, operation goes to Step S503 and Step S504, in which the defocus amount of the focus detection area 51 present in the object area 52 and the defocus amount of the focus detection area 51 present outside the object area 52 are obtained respectively. The defocus amount at each focus detection area 51 has been obtained already in Step S4 of FIG. 5, so that counting is made using this amount.

In the example of FIG. 3A, the focus detection areas 51 designated with reference numerals 12, 13, 18 and 19 are focus detection areas present in the object area 52, and 27 points of the focus detection areas 51 designated with the other reference numerals are focus detection areas present outside the object area 52.

Note that although the operation of the defocus amount in Step S504 is made subsequent to the operation of the defocus amount in Step S503, the operation of the defocus amount in Step S504 can be executed after determination of the focus detection position in the below-described Step S505 and processing of the presence or absence of the focus detection position in the below-described Step S506, as well as when there is no appropriate focus detection position 53 in this Step S506. Whereby, an operation time period of autofocus can be shortened, as well as the power consumption by operation processing can be suppressed.

In the next Step S505, based on the defocus amount having been obtained in Step S503 and S504, an appropriate focus detection position 53 for focusing is determined from among the focus detection areas 51.

Determination conditions of this focus detection position 53, although not particularly limited, can be, for example, the one of being focused in the position most close to the camera (at the nearest end) among the focus detection areas 51, the one of being focused in the position most close to the current position of the focus lens 211 among the focus detection areas, or the one of being positioned most close to the center of the observation screen 50, or the combination thereof. Furthermore, determination conditions can be changed based on a photographing mode having been set using the operation section 150 by a user.

When in Step S506, an appropriate focus detection position 53 is present, operation goes to Step S507, in which it is determined whether or not the selected focus detection position 53 is the focus detection area 51 in the object area 52. When as illustrated in FIG. 3A, the focus detection area (reference numeral 19) in the object area 52 is selected as the focus detection position 53, operation goes to Step S516; while when as illustrated in FIG. 3B, the focus detection area (reference numeral 2) outside the object area 52 is selected as the focus detection position 53, operation goes to Step S508, in which one is added to the value of a counter. The counter is first set to be zero by initialization in Step S1 of FIG. 5.

After the addition of the counter is executed in Step S508, operation goes to Step S518, in which it is determined whether or not the present value of the counter is not less than a predetermined value n. This predetermined value n can be a natural number, for example, three.

Here, in processing in the above-mentioned Steps S505 to S507, extracted is the case in which although the focus detection position 53 suitable for focusing is selected in the focus detection area 51, this focus detection position 53 is outside the object area 52. Further, in the case of not less than n times of continuous occurrence of such case, this object area 52 is regarded as an area that has been e.g., misrecognized to be unsuitable for the tracking operation.

In the next Step S519, when the current value of the counter is not less than n, template image data by object recognition is reset, as well as an object position is recognized again based on newly set template image data. This processing corresponds to the processing from S103 to Step S106 in FIG. 4.

Incidentally, in Step S519, only processing of resetting template image data by object recognition can be executed, or the template image data is used as it is and only retrying recognition processing of an object position can be executed.

According to a series of processing in the above-mentioned Steps S501 to S508 and Steps S518 to S519, extracted can be the case in which although the focus detection position 53 suitable for focusing is selected in the focus detection area 51, this focus detection position 53 is present outside the object area 52. Further, in the case of not less than n times of continuous occurrence of such case, this object area 52 is regarded as an area that has been e.g., misrecognized to be unsuitable for tracking operation. Furthermore, in such case, since the object area 52 being currently recognized (tracked) is the position that cannot be effectively utilized for focusing, restart of the tracking operation of resetting template image data as well as recognizing an object position again. Whereby, the object position that can be effectively utilized can be recognized.

Incidentally, when the tracking operation is restarted in Step S519, operation goes to Step S520, in which the counter is reset.

Returning to Step S501, here when the difference between the AF storage time and the storage time of object recognition information is not within a predetermined time period, that is when recognition information of the object is old, in Step S509, a flag is set to be zero, and operation goes to Step S511.

Whereas, in Step S501, when although the difference between the AF storage time and the storage time of object recognition information is within a predetermined time period, in Step S502, no focus detection area 51 is present in the object area 52, that is in the case as illustrated in FIG. 3C, in Step S510, the flag is set to be one, and thereafter operation goes to Step S511.

This flag is a flag to see whether the processing route leading to Step S511 is a processing route from Step S501 or a processing route from Step S502, and is the one for determination in the below-described Step S515 on whether or not recognition information of an object is new enough to be able to be used as it is.

In Step S511, since it is the case in which recognition information of an object is old to be inappropriate for use (Step S501→S509→S511), or in which although object information is new, no focus detection area 51 is present in the object area 52 (Step S501→S502→S510→S511), determination of a focus detection position only with the focus detection area 51 is made. Therefore, the defocus amount in the focus detection areas 51 around the focus detection position 53 previously selected which focus detection areas 51 include this focus detection position 53 is operated.

In Step S512, from among a plurality of the focus detection areas 51 obtained by operation in Step S511, the focus detection position 53 suitable for focusing is determined.

Here, determination conditions of this focus detection position 53, although not particularly limited as is the processing in Step S505, can be, for example, the one of being focused in the position most close to the camera (at the nearest end) among the focus detection areas 51, the one of being focused in the position most close to the current position of the focus lens 211 among the focus detection areas, or the one of being positioned most close to the center of the observation screen 50, or the combination thereof. Furthermore, determination conditions can be changed based on a photographing mode set using the operation section 150 by a user. In addition, these determination conditions can be the same as those in Step S505 or can be conditions different therefrom.

When in step S512, an appropriate focus detection position 53 is present, operation goes to Step S514, in which it is determined whether or not the similarity or the reliability of the object area 52 being currently obtained is higher than a predetermined value.

When in Step S514, the similarity or the reliability of the object area 52 is lower than the predetermined value, recognition information of this object area 52 is of low utility, so that operation goes to Step S517, in which one is added to the value of the counter.

Whereas, when in Step S514, the similarity or the reliability of the object area 52 is higher than the predetermined value, recognition information of this object area 52 is of high utility even if it is old. Thus, operation goes to Step S515, in which after it has been confirmed that the flag is zero, without addition to the counter value or reset of the counter, operation goes to Step S518.

Furthermore, when in Step S514 the similarity or the reliability of the object area 52 is higher than the predetermined value, as well as in Step S515 the flag is determined to be one, that is even when recognition information of the object area 52 is new, as well as no focus detection area 51 is present in the object area 52, recognition information of the object area 52 can be utilized as it is. Therefore, operation goes to Step S516, in which the counter is reset, and thereafter operation goes to Step S518.

According to a series of processing in the above-described Steps S501→S509→S511 to S514→S517→S518 to S519, when recognition information of the current object area 52 is old as compared with focus detection information, this object area 52 is the position that cannot effectively be utilized for focusing, so that executed is the restart of tracking operation of resetting template image data as well as retrying recognition of an object position. Whereby, the object position that can effectively be utilized can be recognized.

Furthermore, according to a series of processing in Steps S501 to S502→S510→S511 to S514→S517→S518 to S519, when although recognition information of the current object area 52 is not old compared with focus detection information, no focus detection area 51 is present in the object area 52, as well as the similarity or the reliability of the object area 52 is not high, this object area 52 is the position that cannot effectively be utilized for focusing, so that executed is the restart of tracking operation of resetting template image data as well as retrying recognition of the object position. Whereby, the object position that can effectively be utilized can be recognized.

Incidentally, when as is FIG. 3C, no focus detection area 51 is present in the object area 52, the focus detection area to be employed is determined based on the defocus amount. Even when no focus detection area 51 is present in the object area 52, in the case of high reliability of tracking operation, no resetting of template image data or no retrying recognition of the tracking position is made. (Step S514→S515→S516)

Whereas, according to a series of processing in Steps S501→S509→S511 to S515→S518 to S519, although recognition information of the current object area 52 is old as compared with focus detection information, due to that this object area 52 is regarded to be the position that can effectively be utilized for focusing, a counter-up for the restart of tracking operation is not carried out.

Furthermore, according to a series of processing in Steps S501 to S502→S510→S511 to S515→S516→S518 to S519, when although no focus detection area 51 is present in the object area 52, the similarity or the reliability of the object area 52 is high, due to that this object area 52 is regarded to be the position that can effectively be utilized for focusing, the counter is reset.

Incidentally, when in Step S507, the selected focus detection position 53 is present in the object area 52, due to that recognition information of this object area 52 is regarded to be appropriate, operation goes to Step S516, in which the counter is reset.

In addition, when in Step S506 and Step S513, the focus detection position 53 is not determined, the counter is reset in Step S516. In this case, no appropriate focus detection position 53 is determined, so that it will be the processing of returning to Step S3 from Step S6 in FIG. 5, and operation is made from detection of a focusing state again.

Returning to FIG. 5, after the focus detection position 53 is determined as described above, in Step S7, at the lens driving amount operation section 164, the driving amount of the focus lens 211 is operated based on the defocus amount of the selected focus detection position 53. Further, in Step S8, a drive signal is output to the lens drive motor 230 from the lens drive controller 165, and the focus lens 211 is driven to a focused position.

Incidentally, although in the above-described embodiment, focus detection is arranged to be done by the so-called phase difference detection method, the focus detection method, other than this method, can employ a contrast detection method by the so-called hill-climbing method, or the method in which there is provided at the image pickup device 110 a pair of focus detecting pixels, and a focus is detected with this phase difference.

The latter pupil division phase difference detection method will be described. For example, at five points of the center of an imaging surface as well as symmetric positions about this center at top and bottom, and left and right of the image pickup device 110 illustrated in FIG. 1, instead of an imaging pixel of picking up an image having passed an imaging optical system, there are arranged a focus detection pixel array that is formed of a plurality of focus detection pixels. One focus detection pixel is formed of a micro lens and a pair of photoelectric conversion sections, and a pair of the photoelectric conversion sections is of the same size as well as disposed in symmetric positions at top and bottom, and left and right with respect to an optical axis of the micro lens. These photoelectric conversion sections are configured to receive a pair of luminous fluxes passing through a specified exit pupil (for example, F2.8) of the imaging optical system using the micro lens.

Here, one of the photoelectric conversion sections of the focus detection pixel outputs a signal corresponding to the intensity of an image to be formed on the micro lens by one of the focus detection luminous fluxes having passed through one distance-measuring pupil. Whereas, the other photoelectric conversion section outputs a signal corresponding to the intensity of an image to be formed on the micro lens by the other focus detection luminous flux having passed through the other distance-measuring pupil.

Furthermore, outputs from a pair of the photoelectric conversion sections of each focus detection pixel of the focus detection pixel array are gathered in output groups corresponding to a pair of distance-measuring pupils respectively, thereby enabling to obtain data regarding an intensity distribution of a pair of images the focus detection luminous fluxes passing through respective distance-measuring pupils form on the focus detection pixel array. With respect to this intensity distribution data, by application of total image run-out detection operation processing such as correlation operation processing or phase difference detection processing, a total image run-out amount by the so-called pupil division phase difference detection method can be detected.

What is claimed is:

1. An image recognition device comprising:
an image pickup device that picks up an image through a lens;
a focus detector that detects a focusing state of a plurality of focus detection areas that are set in an imagefield;
a first determination device that determines a first area satisfying a predetermined condition from the plurality of focus detection areas based on the focusing states of the plurality of focus detection areas;
a recognizer that recognizes a main object in an image picked up by the image pickup device by using a reference image;
a second determination device that determines a second area corresponding to a position of the main object based on a result of recognition by the recognizer;
a judgment device that judges whether the first area is out of the second area or not; and
a controller that executes at least one of resetting of the reference image and retrying recognition of the position corresponding to the reference image when the judgment device judges that the first area is out of the second area.

2. An image recognition device comprising:
an image pickup device that picks up an image through a lens;
a focus detector that detects a focusing state of a plurality of focus detection areas that are set in an imagefield;
a first determination device that determines a first area satisfying a predetermined condition from the plurality of focus detection areas based on the focusing states of the plurality of focus detection areas;
a recognizer that recognizes a main object in an image picked up by the image pickup device by using a reference image;
a second determination device that determines a second area corresponding to a position of the main object based on a result of recognition by the recognizer;
a judgment device that judges whether the first area is out of the second area or not; and
a controller that does not execute at least one of the resetting of the reference image and the retrying recognition of the position corresponding to the reference image when the second area is reliable, although the first area is absent in the second area.

3. An image recognition device comprising:
a focus detector that detects a focusing state of an optical system with respect to a plurality of focus detection positions that are set in an imagefield of the optical system;
a recognizer that sets a reference image regarding an image to be a reference, and recognizes a position corresponding to the reference image belonging to an image by the optical system;
a selector that selects one of the focus detection positions to be a target of focus adjustment of the optical system based on one of the focusing state and the position corresponding to the reference image recognized by the recognizer; and
a controller that executes at least one of resetting of the reference image and retrying recognition of the position corresponding to the reference image when the focus detection position is selected based on the focusing state;
wherein the selector selects the focus detection position based on the focusing state or the position corresponding to the reference image satisfying a predetermined condition, and selects the focus detection position based on whether the focus detection position is present or not in the position corresponding to the reference image; and
wherein the controller does not execute at least one of the resetting of the reference image and the retrying recognition of the position corresponding to the reference image when the position corresponding to the reference image is reliable, although the focus detection position is absent in the position corresponding to the reference image.

4. The image recognition device according to claim 3, wherein the controller executes at leak one of the resetting of the reference image and the retrying recognition of the position corresponding to the reference image when a difference between a time of setting the reference image and a time of detecting the focusing state is not less than a predetermined time period.

5. The image recognition device according to claim 3, wherein the controller executes at least one of the resetting of the reference image and the retrying recognition of the position corresponding to the reference image when a focus detection position is absent in the position corresponding to the reference image, although a difference between a time of setting the reference image and a time of detecting the focusing state is within a predetermined time period.

6. A focus adjustment device comprising an image recognition device according to claim 3.

7. An imaging device comprising an image recognition device according to claim 3.

8. The imaging device according to claim 7, further comprising
an observation optical system that can observe an image in the optical system, wherein
the recognizer is disposed in the observation optical system, and includes an image pickup device that picks up an image in the optical system, and recognizes the position corresponding to the reference image based on image data picked up by the image pickup device.

9. An image recognition device comprising:
a focus detector that detects a focusing state of an optical system with respect to a plurality of focus detection positions that are set in an imagefield of the optical system;

a recognizer that sets a reference image regarding an image to be a reference, and recognizes a position corresponding to the reference image belonging to an image by the optical system;

a selector that selects one of the focus detection positions to be a target of focus adjustment of the optical system based on one of the focusing state and the position corresponding to the reference image recognized by the recognizer; and a controller that executes at least one of resetting of the reference image and retrying recognition of the position corresponding to the reference image when the focus detection position is selected based on the focusing state;

wherein the selector selects the focus detection position based on the focusing state or the position corresponding to the reference image satisfying a predetermined condition; and wherein the controller executes at least one of the resetting of the reference image and the retrying recognition of the position corresponding to the reference image when a focus detection position that is present outside the position corresponding to the reference image is selected by the selector.

10. The image recognition device according to claim 9, wherein the controller executes at least one of the resetting of the reference image and the retrying recognition of the position corresponding to the reference image when a difference between a time of setting the reference image and a time of detecting the focusing state is not less than a predetermined time period.

11. The image recognition device according to claim 9, wherein the controller executes at least one of the resetting of the reference image and the retrying recognition of the position corresponding to the reference image when the focus detection position is absent in the position corresponding to the reference image, although a difference between a time of setting the reference image and a time of detecting the focusing state is within a predetermined time period.

12. A focus adjustment device comprising an image recognition device according to claim 9.

13. An imaging device comprising an image recognition device according to claim 9.

14. The imaging device according to claim 13, further comprising:

an observation optical system that can observe an image in the optical system, wherein the recognizer is disposed in the observation optical system, and includes an image pickup device that picks up an image in the optical system, and recognizes the position corresponding to the reference image based on image data picked up by the image pickup device.

15. An image recognition method comprising:

detecting a focusing state of an optical system with respect to a plurality of focus detection positions that are set in an imagefield of the optical system;

setting a reference image regarding an image to be a reference;

recognizing a position corresponding to the reference image belonging to an image by the optical system;

selecting one of the focus detection positions to be a target of focus adjustment of the optical system based on one of the focusing state and the position corresponding to the reference image recognized in the recognition; and executing at least one of resetting of the reference image and retrying recognition of the position corresponding to the reference image when the focus detection position is selected based on the focusing state;

wherein the focus detection position is selected based on the focusing state or the position corresponding to the reference image satisfying a predetermined condition, and the focus detection position is selected based on whether the focus detection position is present or not in the position corresponding to the reference image; and wherein when the position corresponding to the reference image is reliable, although the focus detection position is absent in the position corresponding to the reference image, at least one of the resetting of the reference image and the retrying recognition of the position corresponding to the reference image is not executed.

16. The image recognition method according to claim 15, wherein at least one of the resetting of the reference image and the retrying recognition of the position corresponding to the reference image is executed when a difference between a time of setting the reference image and a time of detecting the focusing state is not less than a predetermined time period.

17. The image recognition method according to claim 15, wherein at least one of the resetting of the reference image and the retrying recognition of the position corresponding to the reference image is executed when the focus detection position is absent in the position corresponding to the reference image, although a difference between a time of setting the reference image and a time of detecting the focusing state is within a predetermined time period.

18. An image recognition method comprising:

detecting a focusing state of an optical system with respect to a plurality of focus detection positions that are set in an imagefield of the optical system;

setting a reference image regarding an image to be a reference;

recognizing a position corresponding to the reference image belonging to an image by the optical system;

selecting one of the focus detection positions to be a target of focus adjustment of the optical system based on one of the focusing state and the position corresponding to the reference image recognized in the recognition; and executing at least one of resetting of the reference image and retrying recognition of the position corresponding to the reference image when the focus detection position is selected based on the focusing state;

wherein the focus detection position is selected based on the focusing state or the position corresponding to the reference image satisfying a predetermined condition; and wherein at least one of the resetting of the reference image and the retrying recognition of the position corresponding to the reference image is executed when the focus detection position that is present outside the position corresponding to the reference image is selected.

* * * * *